United States Patent
Jia

(10) Patent No.: US 11,263,569 B2
(45) Date of Patent: Mar. 1, 2022

(54) BLOCKCHAIN-BASED INFORMATION PROCESSING METHOD AND APPARATUS, AND DEVICE

(71) Applicant: Advanced New Technologies Co., Ltd., Grand Cayman (KY)

(72) Inventor: Boyan Jia, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 154 days.

(21) Appl. No.: 16/808,217

(22) Filed: Mar. 3, 2020

(65) Prior Publication Data

US 2020/0202356 A1    Jun. 25, 2020

Related U.S. Application Data

(63) Continuation of application No. PCT/CN2020/071104, filed on Jan. 9, 2020.

(30) Foreign Application Priority Data

Jun. 18, 2019 (CN) .......................... 201910527250.3

(51) Int. Cl.
  *G06Q 10/06*     (2012.01)
  *G06Q 20/40*     (2012.01)
  (Continued)

(52) U.S. Cl.
  CPC ... *G06Q 10/06315* (2013.01); *G06F 16/9027* (2019.01); *G06Q 20/405* (2013.01); *H04L 9/0643* (2013.01); *H04L 2209/38* (2013.01)

(58) Field of Classification Search
  None
  See application file for complete search history.

(56) References Cited

U.S. PATENT DOCUMENTS

2016/0342977 A1* 11/2016 Lam .................... G06Q 20/0658
2018/0123882 A1*  5/2018 Anderson ........... H04L 41/0813
(Continued)

FOREIGN PATENT DOCUMENTS

CN      106952117      7/2017
CN      107103054      8/2017
(Continued)

OTHER PUBLICATIONS

Leng, Kaijun, et al. "Research on agricultural supply chain system with double chain architecture based on blockchain technology." Future Generation Computer Systems 86 (2018): 641-649. (Year: 2018).*

(Continued)

*Primary Examiner* — Mehmet Yesildag
(74) *Attorney, Agent, or Firm* — Fish & Richardson P.C.

(57) ABSTRACT

The present specification discloses blockchain-based information processing methods, apparatus, and devices. The blockchain-based information processing method includes: obtaining tree-structured data describing target relationships from a blockchain; obtaining service data of a ith-level target in the tree-structured data describing target relationships from the blockchain, where i is a positive integer; and executing a smart contract used for resource allocation, to allocate resources to each ith-level target based on a resource allocation scheme that is in the smart contract and that corresponds to the service data of each of the one or more ith-level targets.

24 Claims, 10 Drawing Sheets

(51) Int. Cl.
  *H04L 9/06* (2006.01)
  *G06F 16/901* (2019.01)

(56) References Cited

U.S. PATENT DOCUMENTS

| | | | | |
|---|---|---|---|---|
| 2019/0199514 | A1* | 6/2019 | Hari | H04L 9/3297 |
| 2019/0319861 | A1* | 10/2019 | Pan | G06Q 20/405 |
| 2019/0349254 | A1* | 11/2019 | Nolan | H04L 67/1093 |
| 2019/0384748 | A1* | 12/2019 | Roennow | G06F 21/64 |
| 2019/0385120 | A1* | 12/2019 | Yu | H04L 9/3239 |
| 2020/0151787 | A1* | 5/2020 | Kar | G06F 16/2308 |

FOREIGN PATENT DOCUMENTS

| | | |
|---|---|---|
| CN | 108510269 | 9/2018 |
| CN | 108876298 | 11/2018 |
| CN | 108960902 | 12/2018 |
| CN | 109313780 | 2/2019 |
| CN | 109493047 | 3/2019 |
| CN | 109598108 | 4/2019 |
| CN | 109635165 | 4/2019 |
| CN | 110263097 | 9/2019 |
| WO | WO2019090005 | 5/2019 |

OTHER PUBLICATIONS

Noor, Sana, et al. "Energy Demand Side Management within micro-grid networks enhanced by blockchain." Applied energy 228 (2018): 1385-1398. (Year: 2018).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/071104, dated Apr. 8, 2020, 20 pages (with machine translation).

* cited by examiner

BLOCKCHAIN-BASED INFORMATION PROCESSING METHOD AND APPARATUS, AND DEVICE

CROSS-REFERENCE TO RELATED APPLICATIONS

This application is a continuation of PCT Application No. PCT/CN2020/071104, filed on Jan. 9, 2020, which claims priority to Chinese Patent Application No. 201910527250.3, filed on Jun. 18, 2019, and each application is hereby incorporated by reference in its entirety.

TECHNICAL FIELD

Implementations of the present specification relate to the blockchain field, and in particular, to information processing methods and apparatuses, and devices.

BACKGROUND

A blockchain technology, also referred to as a distributed ledger technology, is a new technology in which several computer devices participate in "accounting" to maintain a complete distributed database. Each computer device in the blockchain can participate in data recording, and data can be quickly synchronized between the computer devices. The blockchain technology has been widely used in many fields to build a decentralized system, and various execution programs have been stored in the distributed database in the blockchain for automatic execution.

SUMMARY

According to the first aspect, an implementation of the present specification provides a blockchain-based data processing method, including: obtaining tree-structured data describing target relationships from a blockchain; obtaining service data of a level-i target in the tree-structured data describing target relationships from the blockchain, where i is a positive integer; and executing a smart contract used for resource allocation, to allocate resources to the level-i target based on a resource allocation scheme that is in the smart contract and that corresponds to the service data of the level-i target, so as to obtain a resource allocation result of the level-i target.

According to the second aspect, an implementation of the present specification provides a blockchain-based data processing apparatus, including: a target tree acquisition module, configured to obtain tree-structured data describing target relationships from a blockchain; a data acquisition module, configured to obtain service data of a level-i target in the tree-structured data describing target relationships from the blockchain, where i is a positive integer; and a data processing module, configured to execute a smart contract used for resource allocation, to allocate resources to the level-i target based on a resource allocation scheme that is in the smart contract and that corresponds to the service data of the level-i target, so as to obtain a resource allocation result of the level-i target.

According to a third aspect, an implementation of the present specification provides a computer device, including: a memory, configured to store computer program instructions, and a processor, configured to execute the computer program instructions, where when the computer program instructions are executed by the processor, the blockchain-based information processing method is implemented.

According to the blockchain-based information processing method and apparatus, and the device provided in the implementations of the present specification, the tree-structured data describing target relationships and the service data of the targets are stored in the blockchain; and the blockchain-based consensus mechanism and the tamper-resistant mechanism can ensure truthfulness and reliability of the tree-structured data describing target relationships and the service data. In addition, by executing the smart contract to allocate resources to the targets automatically, the targets become more active so as to obtain more resources, thereby ensuring that benefits of the targets. In addition, by executing the smart contract to allocate resources to the targets target automatically, and execution of the smart contract has advantages such as low human intervention and decentralization, it alleviates the forged resource allocation in the existing technology, thereby ensuring fair resource allocation for the targets.

BRIEF DESCRIPTION OF DRAWINGS

To describe the technical solutions in the implementations of the present specification more clearly, the following briefly introduces the accompanying drawings required for describing the implementations of the present specification. A person of ordinary skill in the field can still derive other drawings from these accompanying drawings without creative efforts.

DESCRIPTION OF IMPLEMENTATIONS

The following describes in detail the features and example implementations of various aspects of the present specification. In order to make the objectives, technical solutions, and advantages of the present specification clearer, the following further describes the present specification in detail with reference to the accompanying drawings and specific implementations.

To alleviate the problem with the existing technology, the implementations of the present specification provide blockchain-based information processing methods and apparatuses, and devices.

Figure 1:
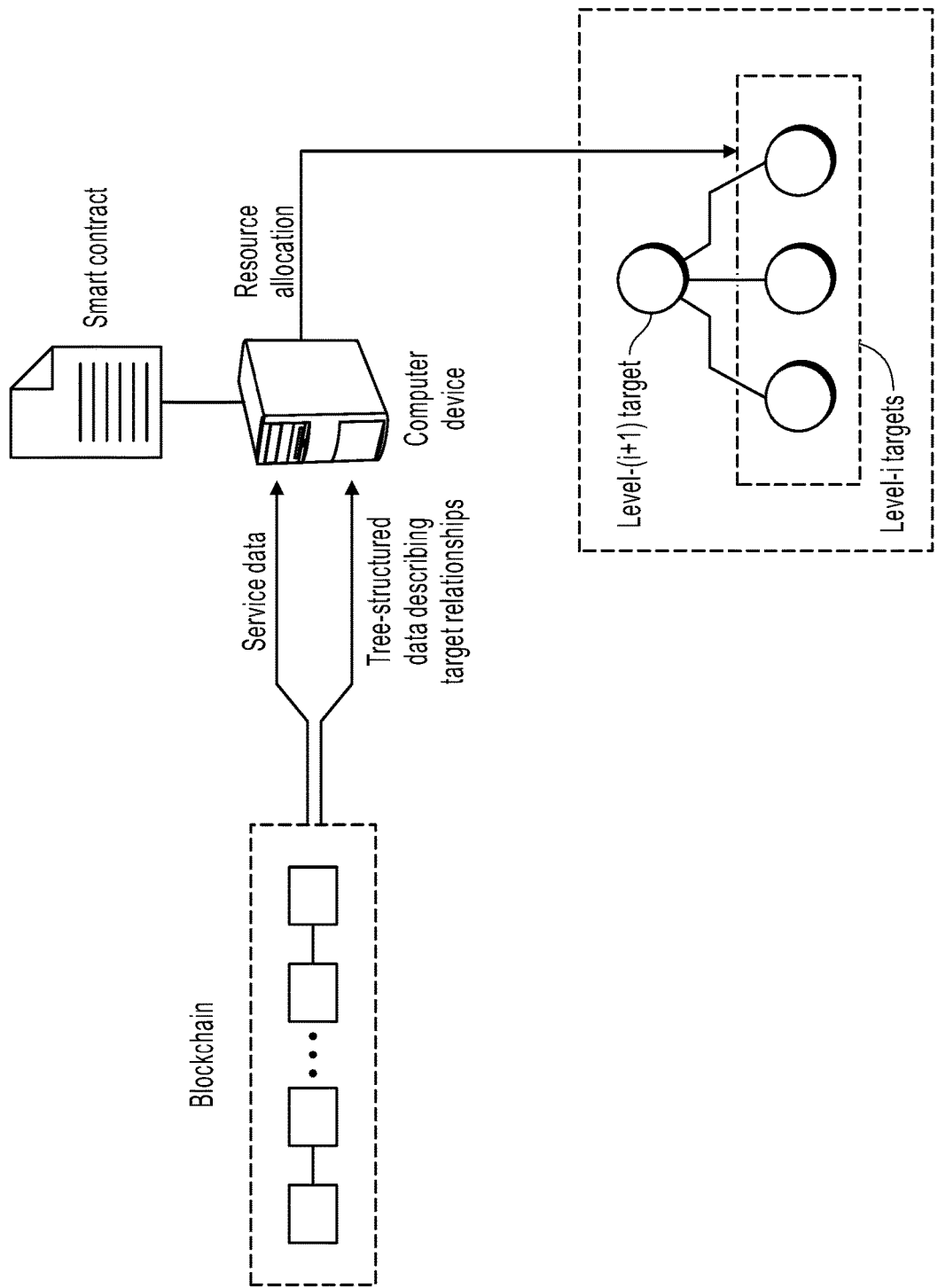
FIG. 1 is a schematic diagram illustrating a system architecture, according to an implementation of the present specification.

To better describe the implementations of the present specification, the following first describes the system architecture used in the implementations of the present specification with reference to FIG. 1. As shown in FIG. 1, a computer device obtains tree-structured data describing target relationships from a blockchain, and obtains service data of one or more level-i targets from the blockchain based on the tree-structured data describing target relationships. In the tree-structured data describing target relationships, the one or more level-i targets are child nodes of the same level-(i+1) target, and the child node is a root of a node subtree; that is, the level-(i+1) target is a parent node of the one or more level-i targets, where i is a positive integer.

The computer device executes a smart contract used for resource allocation. The smart contract includes a plurality of resource allocation schemes. Therefore, resources are allocated to each level-i target based on the resource allocation scheme that is in the smart contract and that corresponds to the service data of each level-i target.

The computer device can be a blockchain node. For example, the blockchain node is a server of an application (APP), and the targets that register the application form tree-structured data describing target relationships. The blockchain node can also be another device communicating with the server, and the device complies with the node service protocol of the running blockchain, and needs to be added to the blockchain to become a blockchain node.

The following describes a blockchain-based data processing method provided in an implementation of the present specification.

Figure 2:
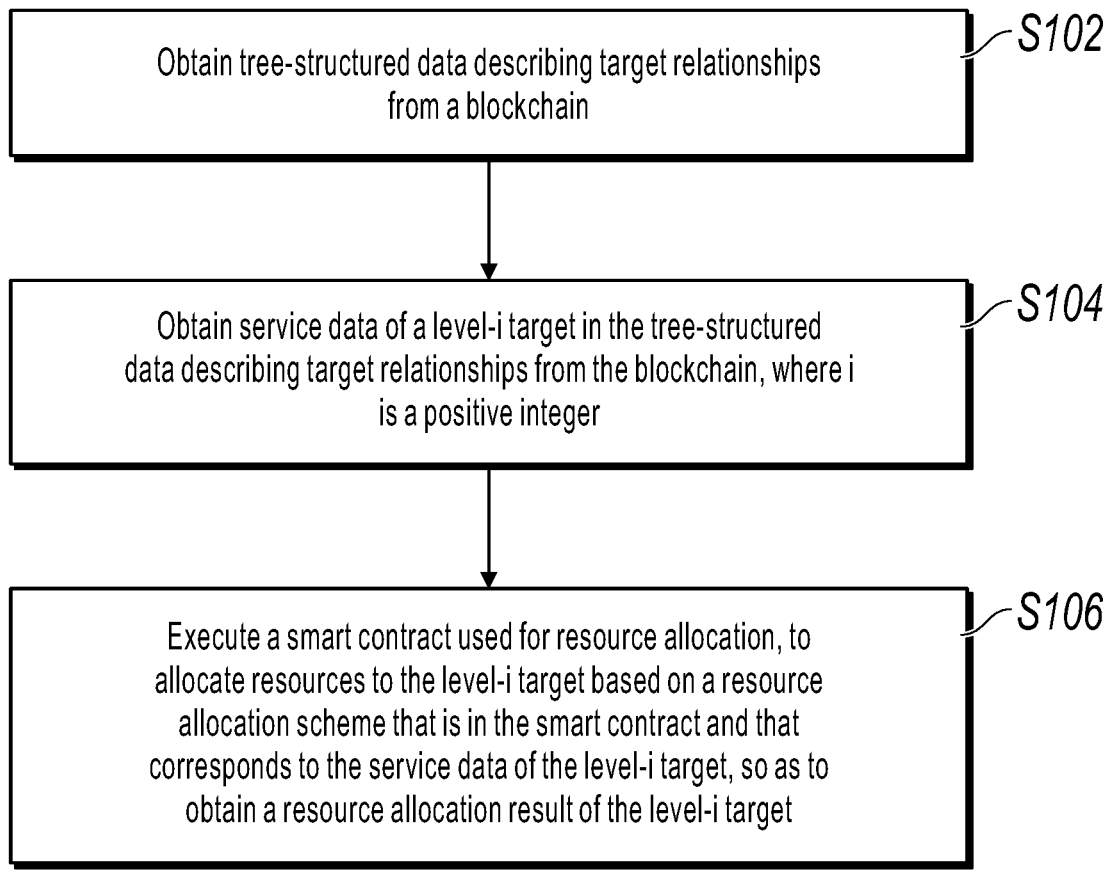
FIG. 2 is a schematic flowchart illustrating a blockchain-based information processing method, according to an implementation of the present specification.

FIG. 2 is a schematic flowchart illustrating a blockchain-based information processing method, according to an implementation of the present specification. As shown in FIG. 2, the blockchain-based information processing method includes S102 and S104.

S102. Obtain tree-structured data describing target relationships from a blockchain.

S104. Obtain service data of a level-i target in the tree-structured data describing target relationships from the blockchain, where i is a positive integer.

There are one or more level-i targets. When there are more than one level-i target, the level-i targets are child nodes of the same level-(i+1) target.

Figure 3:
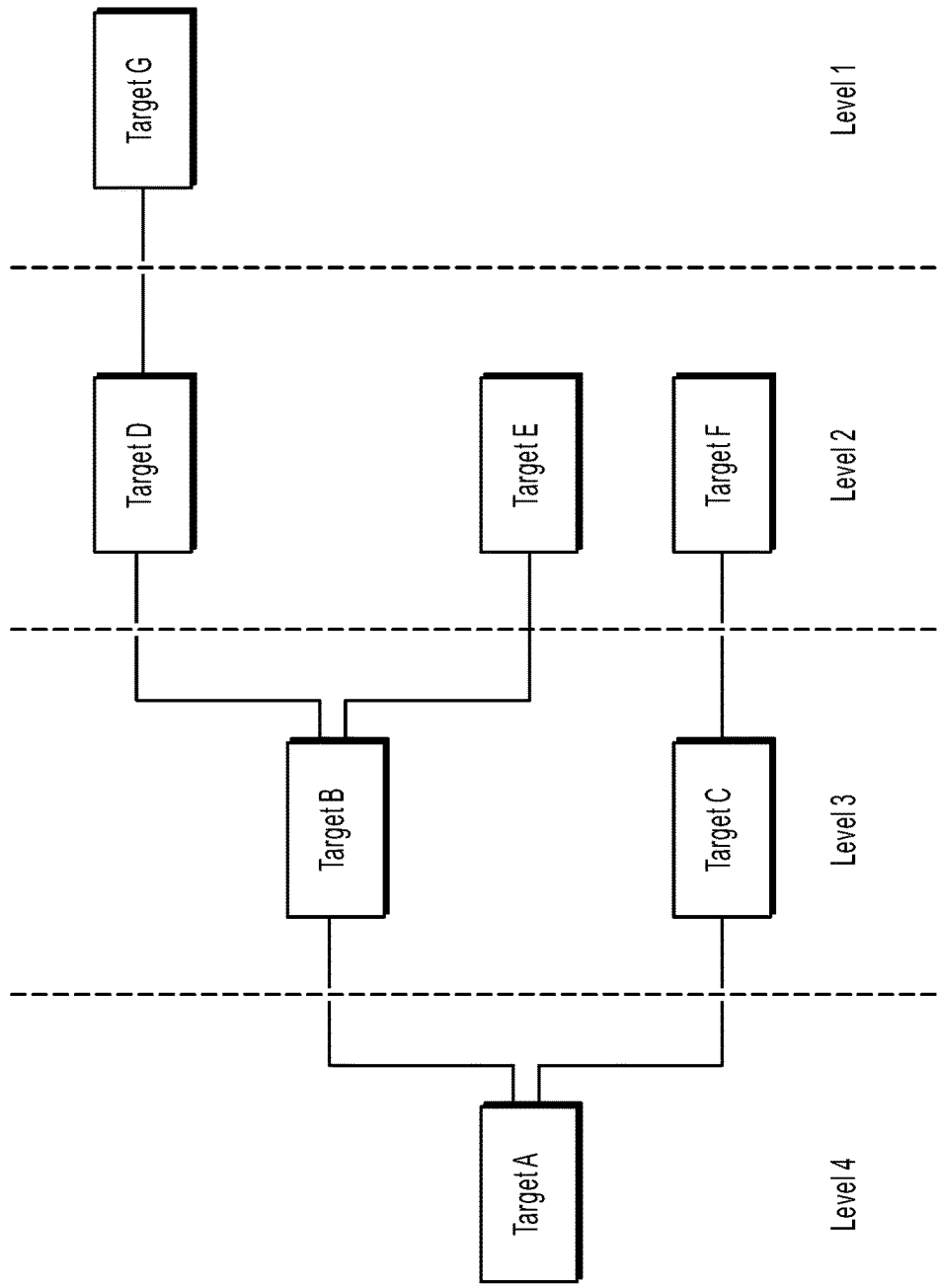
FIG. 3 is a schematic diagram illustrating tree-structured data describing target relationships, according to an implementation of the present specification.

FIG. 3 is a schematic diagram illustrating tree-structured data describing target relationships, according to an implementation of the present specification. As shown in FIG. 3, in tree-structured data describing target relationships, the level-4 target A is of the highest level, and target A is the root node.

Target A has two child nodes: target B and target C. Target B and target C are sibling nodes. Sibling nodes are child nodes under the same parent node.

Target B has two child nodes: target D and target E. Target D and target E are sibling nodes.

Target C has one child node: target F.

S106. Execute a smart contract used for resource allocation, to allocate resources to a level-i target based on a resource allocation scheme that is in the smart contract and that corresponds to the service data of the level-i target, so as to obtain a resource allocation result of the level-i target.

According to the implementations of the present specification, the tree-structured data describing target relationships and the service data of the targets are stored in the blockchain; and the blockchain-based consensus mechanism and the tamper-resistant mechanism can ensure truthfulness and reliability of the tree-structured data describing target relationships and the service data. In addition, by executing the smart contract to allocate resources to the targets, the targets become more active to obtain more resources, thereby ensuring that benefits of the targets. In addition, by executing the smart contract, the resources are allocated to the targets automatically. Because of execution of the smart contract has advantages such as low human intervention and decentralization, it alleviates the forged resource allocation in the existing technology, thereby ensuring fair resource allocation for the targets.

In one or more implementations of the present specification, a smart contract includes a plurality of resource allocation conditions and a resource allocation scheme corresponding to each resource allocation condition.

S106 includes: matching the service data of the level-i target with each resource allocation condition in the smart contract to obtain a resource allocation condition that matches the service data of the level-i target; and allocating resources to the level-i target based on the resource allocation scheme that is in the smart contract and that corresponds to the matched resource allocation condition.

As an example, the previous service data includes a traffic volume value; and the smart contract includes a first resource allocation condition, a first resource allocation scheme corresponding to the first resource allocation condition, a second resource allocation condition, and a first resource allocation scheme corresponding to the second resource allocation condition.

For example, the first resource allocation condition includes that the traffic volume value is in a first range, and the first resource allocation scheme includes: red envelop bonus, upgrading the hierarchical level of a target in the tree-structured data describing target relationships, increasing commission, increasing a profit ratio, and increasing bonus.

The red envelop bonus includes a cash red envelop and/or a coupon.

The second resource allocation condition includes that the traffic volume is in a second range; and the second resource allocation method includes: fines, downgrading the hierarchical level of a target in the tree-structured data describing target relationships, removing the target from the tree-structured data describing target relationships, reducing commission, reducing a profit ratio, and reducing bonus.

In one or more implementations of the present specification, the tree-structured data describing target relationships can be a target service relationship tree structure.

Before S102, the method further includes: obtaining traffic volume values of one or more level-(i−1) targets under an level-i target, where the one or more level-(i−1) targets are child nodes of the level-i target, and i is greater than 1; calculating the sum of the traffic volume values of one or more i−1 targets to be used as the traffic volume value of the i target; and storing the traffic volume value of the level-i target in a blockchain.

That is, the traffic volume value of each level-i target is the sum of the traffic volume values of the one or more level-(i−1) targets under the level-i target.

For example, in FIG. 3, the traffic volume value of target B is the sum of the traffic volume values of target D and target E; and the traffic volume value of target C is the traffic volume value of target F. That is, the traffic volumes of target D and target E are transferred to target B; and the traffic volume of target F is transferred to target C.

The traffic volume values of target B and target C are stored in a blockchain. The traffic volume values of target B and target C under target A are respectively obtained from the blockchain at a predetermined time interval, and then a smart contract is executed, so as to allocate resources for target B and target C based on the smart contract. The traffic volume value can include one of or a combination of the following: sales amount, coupon quantity, and coupon quota.

In one or more implementations of the present specification, after S104, the method further includes storing a resource allocation result of each level-i target in the blockchain. Because of the consensus mechanism in the blockchain, most of the nodes verify the resource allocation result, openness and transparency of the resource allocation are improved, thereby ensuring truthfulness and reliability of the resource allocation result.

In one or more implementations of the present specification, there are two cases for the smart contract.

Case 1: Tree-structured data describing target relationships corresponds to a smart contract.

The smart contract used for resource allocation is a smart contract corresponding to the tree-structured data describing target relationships. If resources need to be allocated for targets of any level in the tree-structured data describing target relationships, resource allocation is performed by executing the same smart contract.

Case 2: Different smart contracts are customized for different targets.

A plurality of targets in the tree-structured data describing target relationships are in one-to-one correspondence with a plurality of smart contracts, and the previous smart contract used for resource allocation is a smart contract corresponding to a level-i target.

In one or more implementations of the present specification, the tree-structured data describing target relationships is a target service relationship tree structure; and the method further includes:

receiving registration data sent by an unregistered first target, where the registration data includes a service tier of the first target; determining a service tier of a second target that is in the target service relationship tree structure and that invites the first target to register; and adding the first target to the target service relationship tree structure based on the size relationship between the service tier of the first target and the service tier of the second target.

As an example, there are three size relationships between the service tier of the first target and the service tier of the second target.

First size relationship: The service tier of the first target is lower than the service tier of the second target.

For the first size relationship, the first target is added to the target service relationship tree structure as a descendant node of the second target. A descendant node of a node is any node in the path from that node to the leaf node (including the leaf node).

Figure 4:
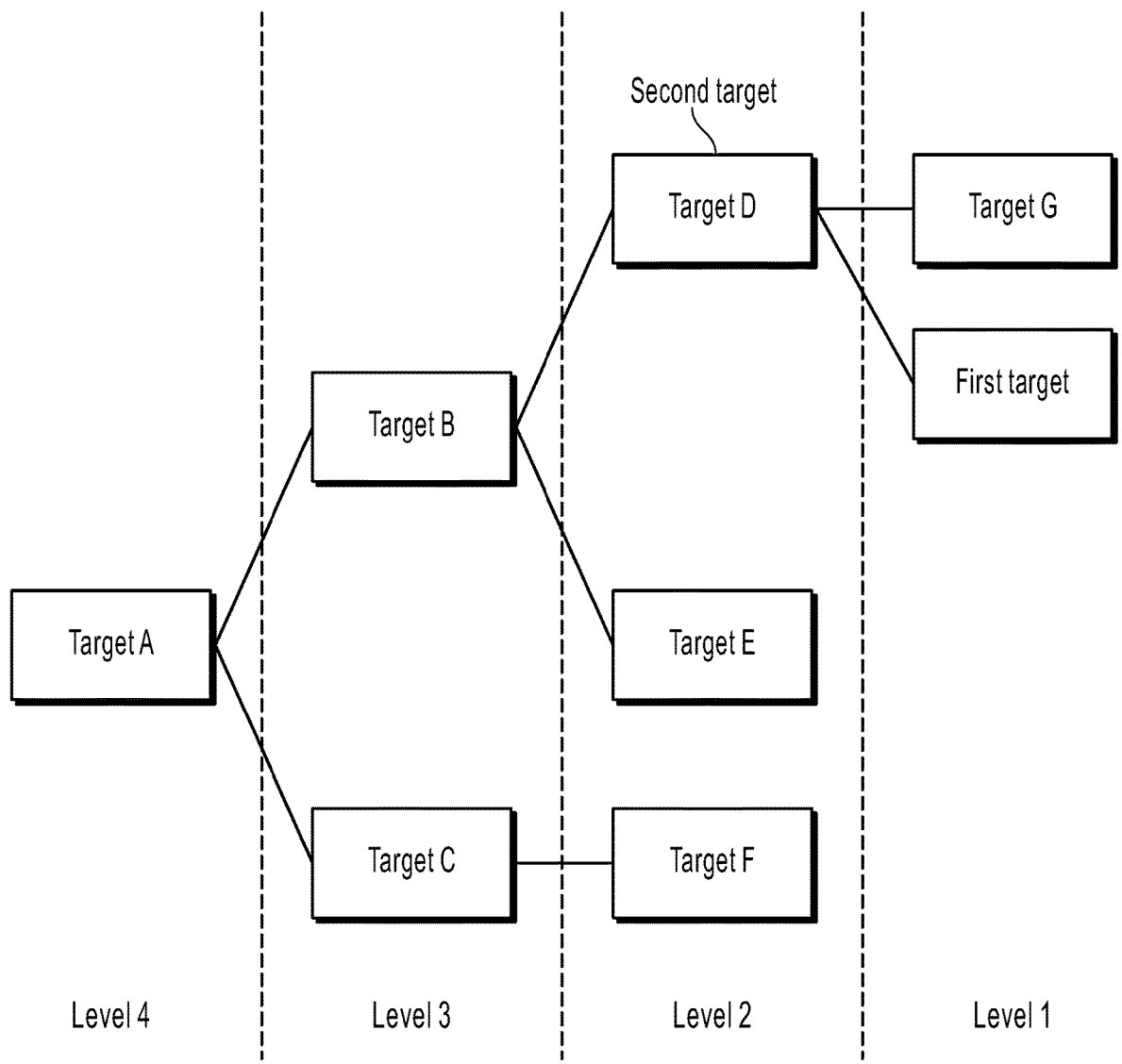
FIG. 4 to FIG. 8 are schematic diagrams illustrating results of adding targets to tree-structured data describing target relationships, according to the five implementations of the present specification.

As shown in FIG. 4, the service tier of the second target (target D) is level 2, and the service tier of the first target is level 1, that is, the service tier of the first target is one level lower than the service tier of the second target. Therefore, the first target is a child node of the second target, where the child node is a descendant node.

Figure 5:
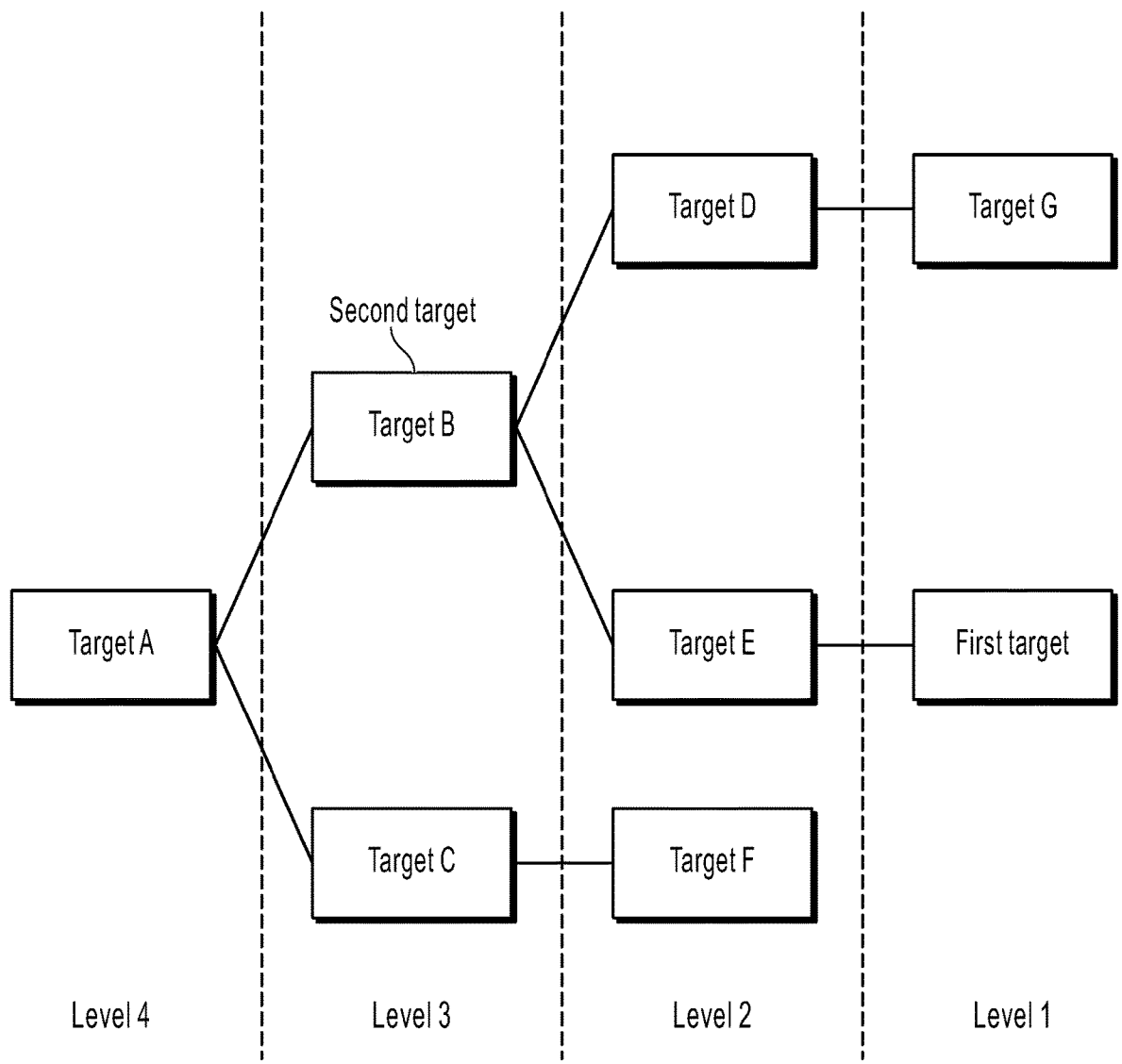

As shown in FIG. 5, the service tier of the second target (target B) is level 3, and the service tier of the first target is level 1, that is, the service tier of the first target is two levels lower than the service tier of the second target, where the first target is a descendant node of the second target. In FIG. 5, the first target is a child node of target E. Alternatively, the first target can be a child node of target D. Whether the first target is a child node of target E or a child node of target D, the first target is a descendant node of second target B.

As such, the second target can invite more first targets whose levels are lower than the service tier of the second target to register, so that there are more targets under the second target, and the traffic volumes of more targets are transferred to the second target, thereby increasing the traffic volume of the second target, and further prompting the second target to invite more targets whose levels are lower than the service tier the second target to register.

Second size relationship: The service tier of the first target is equal to the service tier of the second target.

For the second size relationship, the first target is added to the target service relationship tree structure as a sibling node of the second target. Sibling nodes are child nodes under the same parent node.

Figure 6:
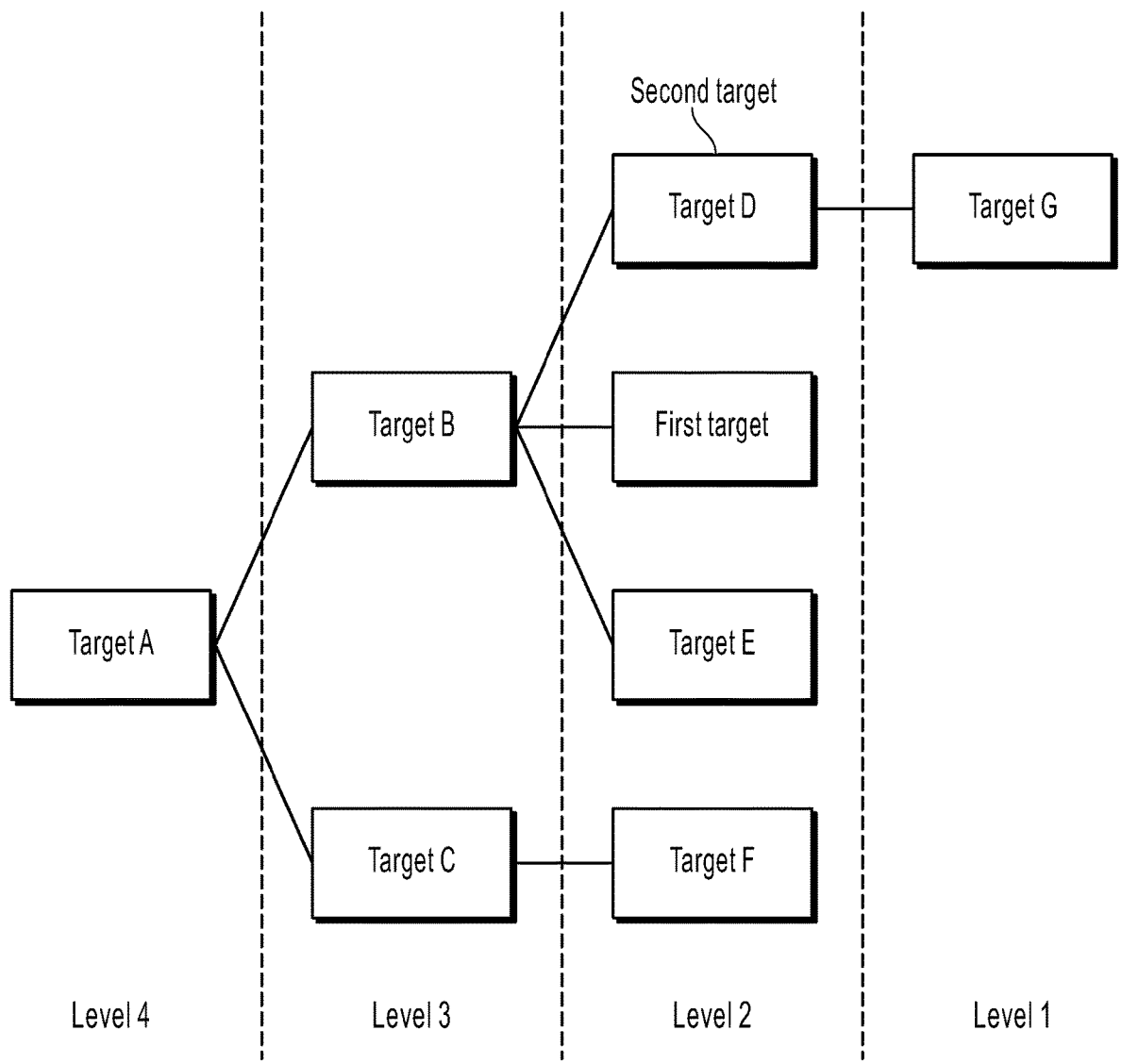

As shown in FIG. 6, the service tier of the second target (target D) is level 2, the service tier of the first target is level 2, and the first target is a sibling node of the second target.

Third type of size relationship: The service tier of the first target is higher than the service tier of the second target.

For the third type of size relationship, in an ancestor node of the second target in the target service relationship tree structure, it is determined whether any target has a service tier higher than the service tier of the first target.

1. If a target has a service tier higher than the service tier of the first target, the target is used as the parent node of the first target, so that the first target is added to the target service relationship tree structure.

Figure 7:
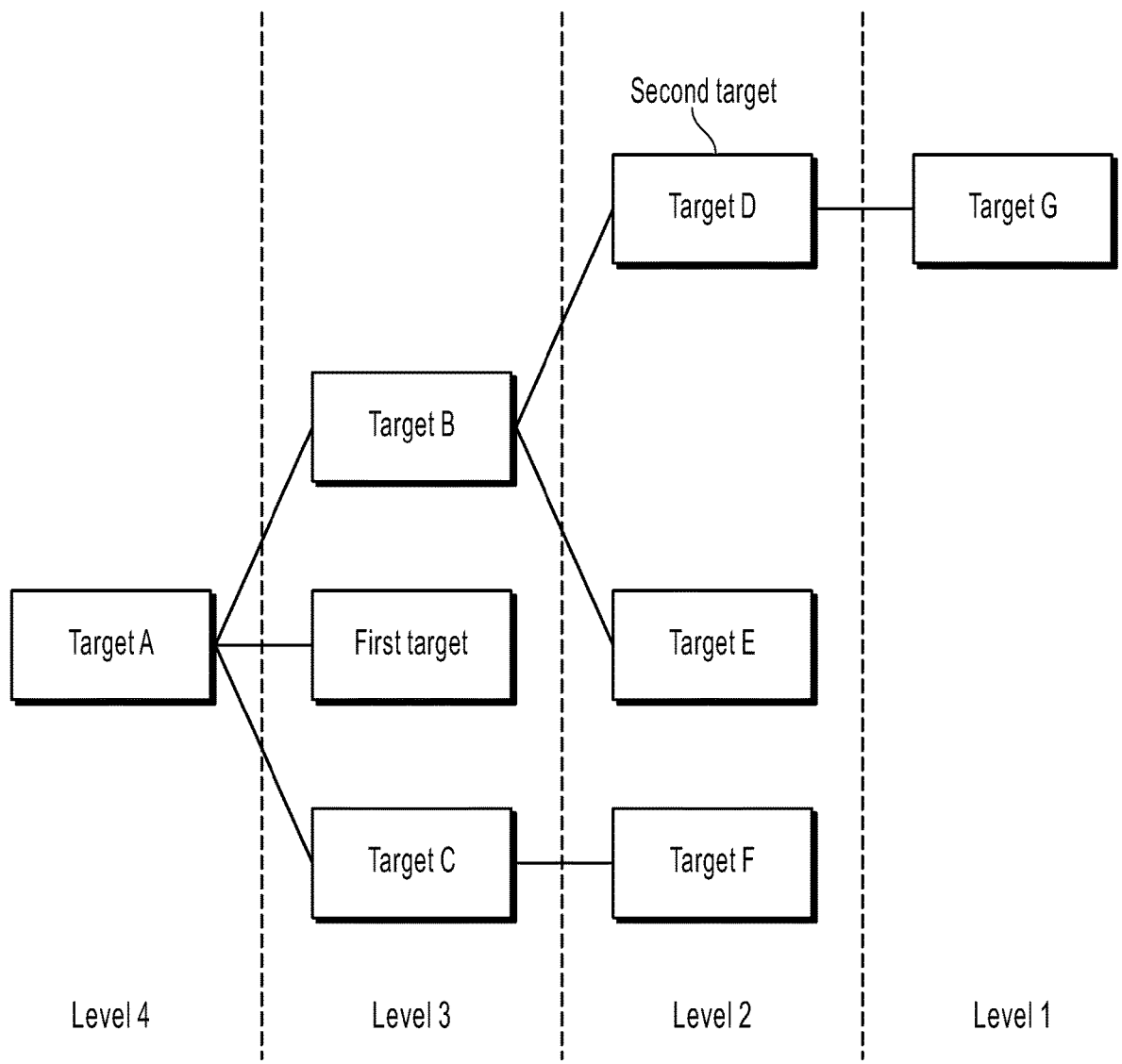

As shown in FIG. 7, the ancestor nodes of the second target (target D) are target B and target A, and a service tier of the first target is level 3. In target B and target A, target A has a service tier higher than the service tier of the first target, and therefore target A is used as the parent node of the first target, so that the first target is added to the target service relationship tree structure.

2. If no target has a service tier higher than the service tier of the first target, the first target is added to the target service relationship tree structure, and no upper-level or lower-level target of the first target exists in the target service relationship tree structure.

Figure 8:
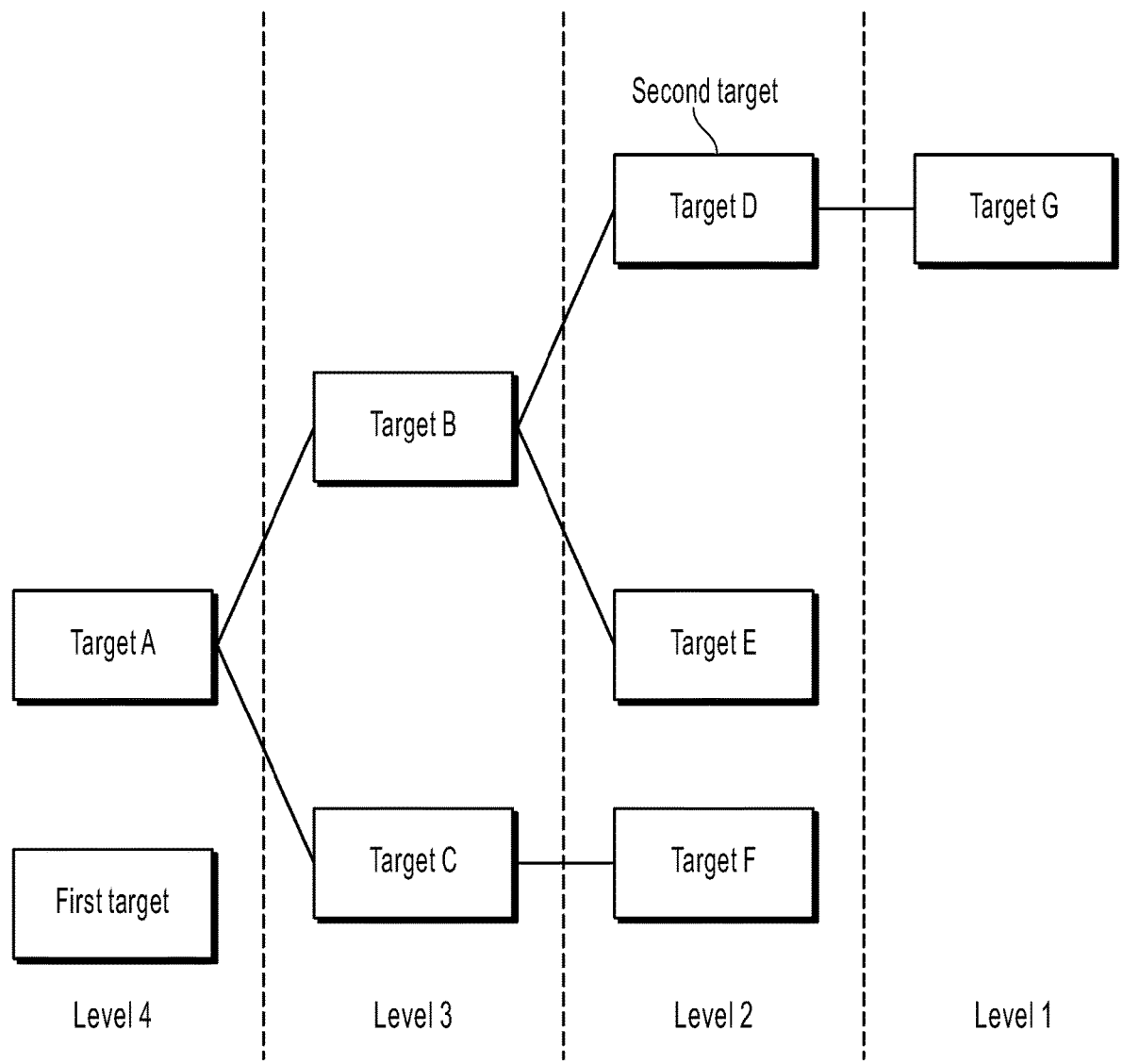

As shown in FIG. 8, the ancestor nodes of the second target (target D) are target B and target A, and the first target is level 4. Because neither the service tier of target B nor the service tier of target A is higher than the service tier of the first target, the first target is a separate node in the target service relationship tree structure; that is, the first target has no upper-level or lower-level target. In this case, the first target can invite unregistered targets to register, so that the first target has higher-level or lower-level targets.

For the second size relationship and the third size relationship, if the second target invites the first target to register, and the service tier of the first target is higher than the service tier of the second target, a red envelop or bonus can be issued to the second target as a reward.

In one or more implementations of the present specification, the tree-structured data describing target relationships is a target invitation relationship tree structure; and the method further includes: if an unregistered first target is to be registered, determining a second target that is in the target invitation relationship tree structure and that invites the first target to register; and adding the first target to the target invitation relationship tree structure by using the first target as a child node of the second target.

In this implementation, if the second target successfully invites the first target to register, no matter the first target is registered as a tier-1 wholesaler, a tier-2 wholesaler, a store, or a consumer, because the first target is invited by the second target, the first target is a child node of the second target in the target invitation relationship tree structure. The greater the traffic volume value of the first target is, the more resources are allocated to the second target (the inviter). The higher the level of a target, the greater the traffic volume value of the target is. Therefore, more resources are allocated to the targets that have invited targets with higher tiers to register, thereby motivating more targets to invite more higher-level targets.

Calculating the traffic volume values of the targets in the target invitation relationship tree structure includes: determining, based on the target service relationship tree structure, one or more next-level service targets that are of the target in the target service relationship tree structure; and calculating the sum of the traffic volume values of the one or more lower-level service targets as the traffic volume value of the target.

Figure 9:
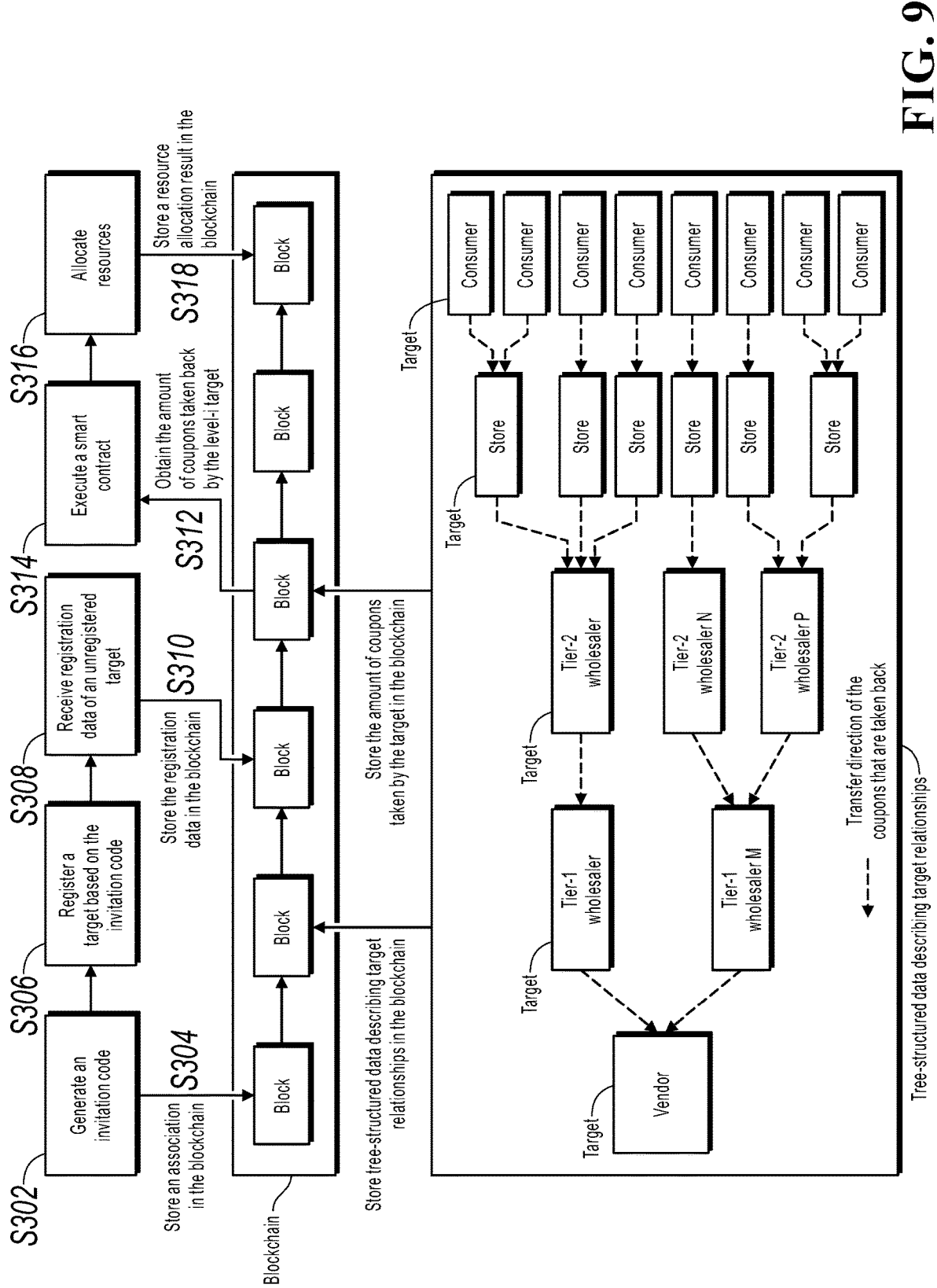
FIG. 9 is a schematic flowchart illustrating a blockchain-based information processing method, according to another implementation of the present specification.

FIG. 9 is a schematic flowchart illustrating a blockchain-based information processing method, according to another implementation of the present specification. As shown in FIG. 9, the blockchain-based information processing method includes S302-S318.

S302. A server (a blockchain node) receives an invitation code generation request sent by a registered target, and generates an invitation code for the registered target in response to the invitation code generation request, so that the registered target invites an unregistered target to register.

The registered target can be any target in the tree-structured data describing target relationships. In addition to generating an invitation code for the registered target, alternatively, a registration link or a character string (for example, $1a8c@d) can be generated.

S304. The server establishes an association between a registered target and an invitation code generated for the registered target, and stores the association in a blockchain.

There are a plurality of registered targets, so that the association between a plurality of registered targets and a plurality of invitation codes is established, and one registered target is associated with one or more invitation codes.

S306. A registered target sends an invitation code to an unregistered target, so that the unregistered target fills in registration data that includes the invitation code.

S308. The server receives registration data sent by an unregistered first target, where the registration data sent by the first target includes a service tier of the first target and a registration invitation code of the first target; and completes registration of the first target based on the registration data issued by the first target.

The target that invites the first target to register is queried in the association relationship based on the registration invitation code of the first target, and the detected target is used as the second target. The first target is added to the tree-structured data describing target relationships based on the size relationship between the service tier of the first target and the service tier of the second target.

S310. The server stores the registration data of the first target in the blockchain.

After a plurality of targets are registered, there are more and more branches in the tree-structured data describing target relationships. The tree-structured data describing target relationships includes the following targets in ascending order of service tier: consumers, stores, tier-2 wholesalers, tier-1 wholesalers, and a vendor. Consumers are level-1 targets. Stores are level-2 targets. Tier-2 wholesalers are level-3 targets. Tier-1 wholesalers are level-4 targets. The vendor is a level-5 target. The vendor is a root node in the tree-structured data describing target relationships.

The vendor issues coupons. The stores can display the two-dimensional codes for obtaining coupons. The consumers scan the two-dimensional codes to obtain the coupons. If the consumers consume coupons at stores, the coupons are transferred to the stores, and the stores take back the coupons. The coupons taken back from the stores are transferred to the tier-2 wholesalers, that is, the tier-2 wholesalers take back the coupons from the stores at the next level.

Whenever the tree-structured data describing target relationships is updated, for example, when a target is added to or deleted from the tree-structured data describing target relationships, the updated tree-structured data describing target relationships is stored in the blockchain so that the target relationship can be queried.

The server periodically calculates the amount of coupons taken back by the targets, and stores the amount of coupons taken back from the targets in the blockchain.

S312. The server periodically obtains the amount of coupons taken back by the next-level target (which is level i) of the level-(i+1) from the blockchain.

For example, a tier-1 wholesaler M has a tier-2 wholesaler N and a tier-2 wholesaler P, and the server obtains the amount of coupons taken back by the tier-2 wholesaler N and the amount of coupons taken back by the tier-2 wholesaler P.

S314. The server executes a smart contract used for resource allocation.

S316. Resources are allocated to the level-i target based on the resource allocation scheme that is in the smart contract and that corresponds to the amount of coupons taken back by the level-i target.

Allocating resources to the i-level target includes increasing or decreasing resources allocated to the i-level target. For example, increasing resources allocated to the i-level target includes rewarding the i-level target; and decreasing resources allocated to the i-level target includes imposing a penalty on the i-level target.

S318. The resource allocation result of the level-i target is stored in the blockchain.

The server in this implementation of the present specification can be a server of an application (APP), a product tracing procedure that is viewed by scanning a tracing code of the APP. The consumers participate in the vendor's marketing campaign to obtain product rebates in the form of red envelops, coupons, etc. The consumers use red envelops or coupons for consumption in the stores. The stores take back the red envelops or coupons used by the consumers. The red envelops or coupons taken back by the stores are transferred to the tier-2 wholesalers. The red envelops or coupons taken by the tier-2 wholesalers are transferred to the tier-1 wholesalers. The red envelops or coupons taken by the tier-1 wholesalers are transferred to the vendor.

Figure 10:
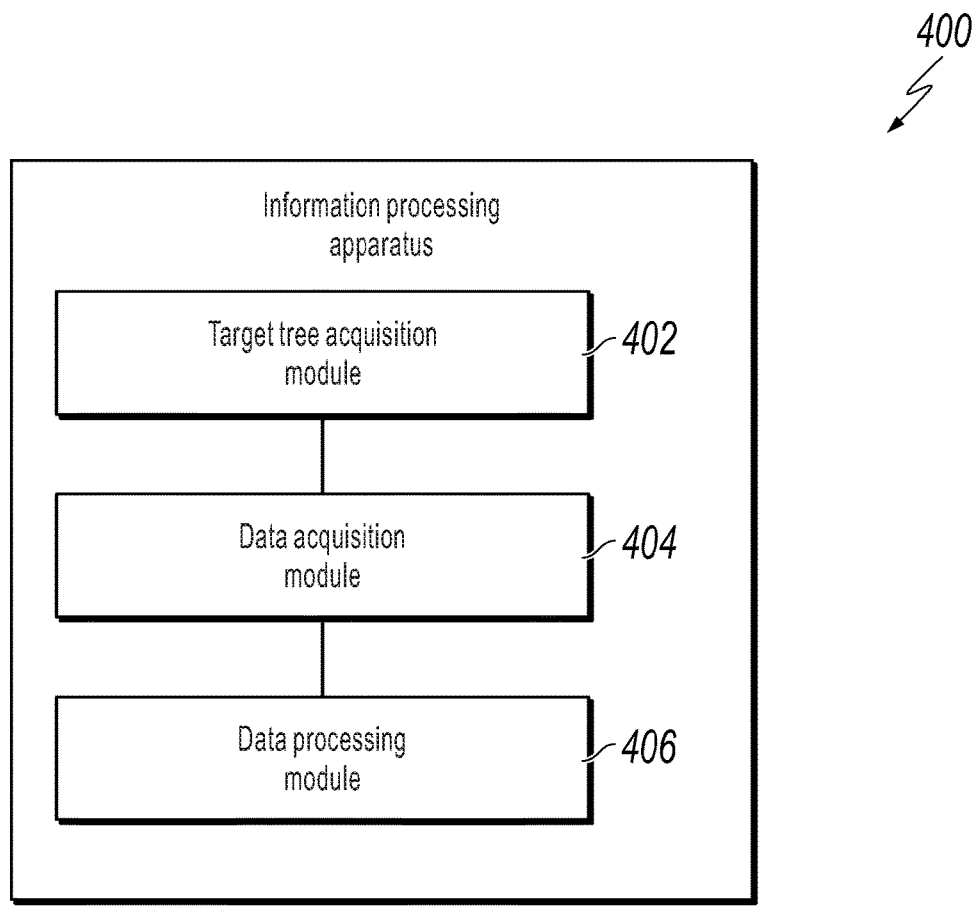
FIG. 10 is a schematic flowchart illustrating a blockchain-based information processing apparatus, according to an implementation of the present specification.

FIG. 10 is a schematic flowchart illustrating a blockchain-based information processing apparatus, according to an implementation of the present specification.

As shown in FIG. 10, the apparatus 400 includes: a target tree acquisition module 402, configured to obtain tree-structured data describing target relationships from a blockchain; a data acquisition module 404, configured to obtain service data of a level-i target in the tree-structured data describing target relationships from the blockchain, where i is a positive integer; and a data processing module 406, configured to execute a smart contract used for resource allocation, to allocate resources to the level-i target based on a resource allocation scheme that is in the smart contract and that corresponds to the service data of the level-i target, so as to obtain a resource allocation result of the level-i target.

In one or more implementations of the present specification, the data processing module 406 includes: a condition matching module, configured to match the service data of the level-i target with each resource allocation condition in the smart contract to obtain a resource allocation condition that matches the service data of the level-i target; and a resource allocation module, configured to allocate resources to the level-i target based on the resource allocation scheme that is in the smart contract and that corresponds to the matched resource allocation condition.

In one or more implementations of the present specification, the service data of the level-i target includes a traffic volume value; and the apparatus 400 further includes: a traffic volume acquisition module, configured to obtain traffic volume values of one or more level-(i−1) targets from the blockchain based on the tree-structured data describing target relationships, where in the tree-structured data describing target relationships, the level-i target is a parent node of the one or more level-(i−1) targets, and i is greater than 1; a traffic volume calculation module, configured to calculate the sum of the traffic volume values of the one or more level-(i−1) targets as the traffic volume value of the level-i target; and a traffic volume storage module, configured to store the traffic volume value of the level-i target in the blockchain.

In one or more implementations of the present specification, the apparatus 400 further includes: an allocation result storage module, configured to store the resource allocation result in the blockchain.

In one or more implementations of the present specification, the smart contract is a smart contract corresponding to tree-structured data describing target relationships; or the smart contract is a smart contract corresponding to the level-i target.

In one or more implementations of the present specification, the tree-structured data describing target relationships is a target service relationship tree structure; and the apparatus 400 further includes: a data receiving module, configured to receive registration data sent by an unregistered first target, where the registration data includes a service tier of the first target; a level determining module, configured to determine a service tier of a second target that is in the target service relationship tree structure and that invites the first target to register; and a target adding module, configured to add the first target to the target service relationship tree structure based on the size relationship between the service tier of the first target and the service tier of the second target.

In one or more implementations of the present specification, the data adding module includes: a first adding module, configured to: if the service tier of the first target is lower than the service tier of the second target, add the first target to the target service relationship tree structure by using the first target as a descendant node of the second target.

In one or more implementations of the present specification, the data adding module includes: a second adding module, configured to: if the service tier of the first target is equal to the service tier of the second target, add the first target to the target service relationship tree structure by using the first target as a sibling node of the second target.

In one or more implementations of the present specification, the data adding module includes: a level determining module, configured to: if the service tier of the first target is higher than the service tier of the second target, determine whether any target in ancestor nodes of the second target in the target service relationship tree structure has a service tier higher than the service tier of the first target; a third adding module, configured to: if the service tier of the first target is higher than the service tier of the second target, add the first target to the target service relationship tree structure by using the first target as a parent node of the second target; a fourth adding module, configured to: if no target has a service tier higher than the service tier of the first target, add the first target to the target service relationship tree structure, where the target service relationship tree structure include an upper-level or lower-level target of the first target.

In one or more implementations of the present specification, the tree-structured data describing target relationships is a target invitation relationship tree structure; and the apparatus 400 further includes: an invitation target determining module, configured to: if an unregistered first target is to be registered, determine a second target that is in the target invitation relationship tree structure and that invites the first target to register; and an invitation target adding module, configured to add the first target to the target invitation relationship tree structure by using the first target as a child node of the second target.

Figure 11:
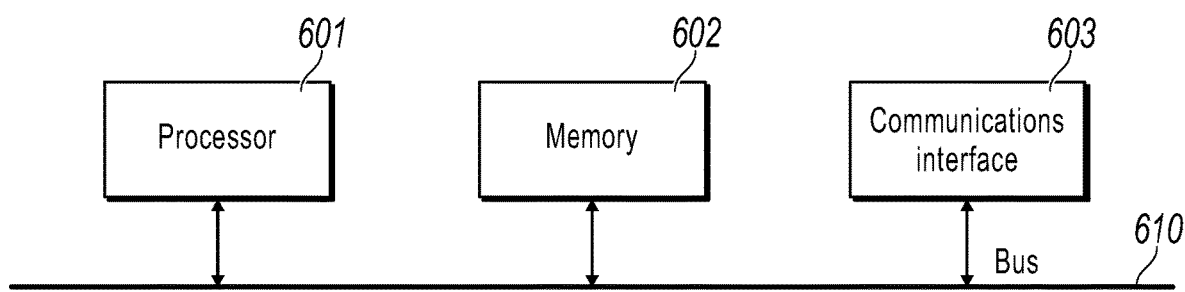
FIG. 11 is a schematic structural diagram illustrating a hardware structure of a computer device, according to an implementation of the present specification.

FIG. 11 is a schematic structural diagram illustrating a hardware structure of a computer device, according to an implementation of the present specification.

The computer device can include a processor 601 and a memory 602 that stores computer program instructions.

Specifically, the processor 601 can include a central processing unit (CPU) or an application-specific integrated circuit (ASIC), or can be configured as one or more integrated circuits for implementing the implementations of the present specification.

The memory 602 can include a large-capacity memory for storing data or instructions. By way of example and not limitation, the memory 602 can include a hard disk drive (HDD), a floppy disk drive, a flash memory, an optical disk, a magneto-optical disk, a magnetic tape, a Universal Serial Bus (USB) drive, or a combination of two or more of them. Where appropriate, the memory 602 can include a removable or non-removable (or fixed) medium. Where appropriate, the memory 602 can be inside or outside an integrated gateway disaster-tolerant device. In a particular implementation, the memory 602 is a non-volatile solid-state memory. In a particular implementation, the memory 602 includes a read-only memory (ROM). Where appropriate, the ROM can be a mask programmed ROM, a programmable ROM (PROM), an erasable PROM (EPROM), an electrically erasable PROM (EEPROM), an electrically erasable ROM (EAROM), or a flash memory, or a combination of two or more of them.

The processor 601 reads and executes the computer program instructions stored in the memory 602 to implement any one of the blockchain-based information processing methods in the previous implementations.

In an example, the computer device can also include a communications interface 603 and a bus 610. As shown in FIG. 11, the processor 601, the memory 602, and the communications interface 603 are connected to and communicate with each other by using the bus 610.

The communication interface 603 is mainly configured to implement communication between modules, apparatuses, units and/or devices in the implementations of the present specification.

The bus 610 includes hardware, software, or both, and is configured to connect the components of the computer device. By way of example but not limitation, the bus can include an accelerated graphics port (AGP) or other graphics bus, an enhanced industrial standard architecture (EISA) bus, a front-end bus (FSB), an hyper transport (HT) interconnection, an industrial standard architecture (ISA) bus, an infinite bandwidth interconnection, a low pin count (LPC) bus, a memory bus, a microchannel architecture (MCA) bus, a peripheral component interconnection (PCI) bus, a PCI-Express (PCI-X) bus, a serial advanced technology attachment (SATA) bus, video electronics standards association local bus (VLB) or other suitable bus, or a combination of two or more of them. Where appropriate, the bus 610 can include one or more buses. Although the implementations of the present specification describe and show a specific bus, the present specification takes any suitable bus or interconnection into consideration.

The computer device can perform the blockchain-based information processing method in the implementations of the present specification, to implement the blockchain-based information processing method and apparatus described with reference to FIG. 2 and FIG. 10.

In addition, with reference to the blockchain-based information processing method in the previous implementations, the implementations of the present specification can provide a computer storage medium for implementation. The computer storage medium stores computer program instructions, and the computer program instructions are executed by the processor to implement any one of the blockchain-based information processing methods in the previous implementations.

The following describes the technical terms used in the present specification.

A smart contract is a computer protocol designed to propagate, validate, or execute a contract in an information-based manner. A smart contract allows for a trustworthy transaction without involving a third party, and such a transaction is traceable and irreversible. A smart contract is designed to provide a safe approach over a traditional contract and to reduce other transaction costs associated with the contract.

A blockchain has a chain data structure that is obtained by concatenating data blocks in chronological order, and is a distributed ledger that uses a cryptographic method to prevent the data blocks from being tampered with or faked. All data in a blockchain is broadcast to all blockchain nodes in an entire network, so that all blockchain nodes have all and consistent data. In a broad sense, a blockchain technology is a brand-new distributed infrastructure and computation method that uses a chain data structure to verify and store data, uses a distributed node consensus algorithm to generate and update data, uses a cryptographic method to ensure data transmission and access security, and uses a smart contract formed by automated script code to program and operate data.

A blockchain includes blocks, and each block records basic data such as a hash value of the previous block, a transaction set in the block, and a hash value of the block. Because each block stores a hash value of the previous block, blocks are chained by using hash values of the blocks to form a blockchain.

The blockchain described in the present specification can specifically include any type of blockchain network. For example, in actual applications, the blockchain can be any one of a public chain, a private chain, and a consortium chain.

It should be clear that the present specification is not limited to the particular configuration and processing that are described above and shown in the figures. Detailed descriptions of the known method technology are omitted here for simplicity. In the previous implementations, some specific steps are described and shown as examples. However, the method process of the present specification is not limited to the specific steps that are described and shown, and a person skilled in the art may make various changes, modifications, or additions, or change an order between steps after understanding the spirit of the present specification.

The functional blocks shown in the above structure block diagram can be implemented by using hardware, software, firmware, or any combination thereof. When the functional blocks are implemented by using hardware, the hardware can be, for example, electronic circuits, application specific integrated circuits (ASICs), appropriate firmware, plug-ins, function cards, etc. When the functional blocks are implemented by using software, the elements of the present specification are programs or code segments used to perform the required tasks. The programs or code segments can be stored in a machine-readable medium or transmitted over a transmission medium or a communications link by using data signals carried in a carrier. The machine readable medium can include any medium capable of storing or transmitting information. Examples of the machine readable medium include electronic circuit, semiconductor memory device, ROM, flash memory, erasable ROM (EROM), floppy disk, CD-ROM, optical disk, hard disk, optical fiber medium, radio frequency (RF) link, etc. Code segments can be downloaded through computer networks such as the Internet and an intranet.

It is also worthwhile to note that the example implementations in the present specification describe some methods or systems based on a series of steps or apparatuses. However, the present specification is not limited to the sequence of the previous steps; that is, the steps can be performed in the sequence mentioned in the implementations or in a sequence different from the sequence in the implementations, or several steps can be simultaneously performed.

The previous descriptions are merely specific implementations of the present specification. It should be clearly understood by a person skilled in the art that, for the purpose of convenient and brief description, for a detailed working process of the previous system, module, and unit, references can be made to a corresponding process in the previous method implementations, and details are omitted here for simplicity. It should be understood that the protection scope of the present specification is not limited thereto, and a person skilled in the art may easily make any equivalent modifications or replacements within the technical scope of the disclosure of the present specification, and such modifications or replacements shall fall within the protection scope of the present specification.

It should be understood that the specific implementations described in the present specification are only used to interpret the present specification and are not used to limit the present specification. For a person skilled in the art, the present specification can be implemented without some of the specific details. The following description of the implementations is only intended to provide a better understanding of the present specification by illustrating examples of the present specification.

It is worthwhile to note that, in the present specification, relational terms such as "first" and "second" are only used to distinguish one entity or operation from another, and do not necessarily require or imply that any actual relationship or sequence exists between these entities or operations. In addition, the terms "include", "comprise", or any other variant is intended to cover a non-exclusive inclusion, so that a process, a method, a product, or a device that includes a list of elements not only includes those elements but also includes other elements that are not expressly listed, or further includes elements inherent to such a process, method, product, or device. An element described by "includes a . . . " further includes, without more constraints, another identical element in the process, method, product, or device that includes the element.

What is claimed is:

1. A computer-implemented method comprising:
obtaining, by a blockchain node of a blockchain, tree-structured data describing target relationships corresponding to the blockchain;
obtaining, by the blockchain node, traffic volume values of one or more (i−1)-th-level targets based on the tree-structured data describing the target relationships, wherein an i-th-level target within the tree-structured data is a parent node of the one or more (i−1)-th-level targets and i is greater than 1;
calculating, by the blockchain node, a sum of the traffic volume values of the one or more (i−1)-th-level targets as a traffic volume value of the i-th-level target;
generating, by the blockchain node, a first encrypted traffic volume value of the i-th-level target by encrypting the traffic volume value of the i-th-level target using a cryptographic process;
sending, by the blockchain node, the first encrypted traffic volume value of the i-th-level target to at least one other blockchain node of the blockchain as part of a distributed node consensus process;
obtaining, by the blockchain node, a second encrypted traffic volume value of the i-th-level target from the at least one other blockchain node, wherein i is a positive integer;
executing, by the blockchain node, a smart contract to allocate resources to the i-th-level target based on a resource allocation scheme in the smart contract that corresponds to the first encrypted traffic volume value of the i-th-level target and the second encrypted traffic volume value of the i-th-level target; and
automatically allocating, by the blockchain node, the resources to the i-th-level target in response to executing the smart contract.

2. The computer-implemented method of claim 1, wherein allocating the resources to the i-th-level target comprises:
comparing the traffic volume value of the i-th-level target with each resource allocation condition in the smart contract to obtain a resource allocation condition that matches the traffic volume value of the i-th-level target; and
allocating the resources to the i-th-level target based on the resource allocation scheme that is in the smart contract and that corresponds to the matched resource allocation condition.

3. The computer-implemented method of claim 1 further comprising:
storing a resource allocation result of the i-th-level target in the blockchain.

4. The computer-implemented method of claim 1, wherein
the smart contract is a smart contract corresponding to the tree-structured data describing the target relationships; or
the smart contract is a smart contract corresponding to the i-th-level target.

5. The computer-implemented method of claim 1, wherein the tree-structured data describing the target relationships is a target service relationship tree structure, and the method further comprises:
receiving registration data sent by an unregistered first target, wherein the registration data comprises a service tier of the first target;
determining a service tier of a second target that is in the target service relationship tree structure and that invites the first target to register; and
adding the first target to the target service relationship tree structure based on a comparison between the service tier of the first target and the service tier of the second target.

6. The computer-implemented method of claim 5, wherein adding the first target to the target service relationship tree structure comprises:
determining that the service tier of the first target is lower than the service tier of the second target; and
responsive to determining that the service tier of the first target is lower than the service tier of the second target, adding the first target to the target service relationship tree structure by using the first target as a descendant node of the second target.

7. The computer-implemented method of claim 5, wherein adding the first target to the target service relationship tree structure comprises:
determining that the service tier of the first target is equal to the service tier of the second target; and
responsive to determining that the service tier of the first target is equal to the service tier of the second target, adding the first target to the target service relationship tree structure as a sibling node of the second target.

8. The computer-implemented method of claim 1, wherein the tree-structured data describing the target relationships is a target invitation relationship tree structure, and the method further comprises:
determining that an unregistered first target is to be registered;
responsive to determining that the unregistered first target is to be registered, determining a second target that is in the target invitation relationship tree structure and that invites the first target to register; and
adding the first target to the target invitation relationship tree structure by using the first target as a child node of the second target.

9. A non-transitory, computer-readable medium storing one or more instructions executable by a computer system to perform operations comprising:
obtaining, by a blockchain node of a blockchain, tree-structured data describing target relationships corresponding to the blockchain;
obtaining, by the blockchain node, traffic volume values of one or more (i−1)-th-level targets based on the tree-structured data describing the target relationships, wherein an i-th-level target within the tree-structured data is a parent node of the one or more (i−1)-th-level targets and i is greater than 1;
calculating, by the blockchain node, a sum of the traffic volume values of the one or more (i−1)-th-level targets as a traffic volume value of the i-th-level target;
generating, by the blockchain node, a first encrypted traffic volume value of the i-th-level target by encrypting the traffic volume value of the i-th-level target using a cryptographic process;
sending, by the blockchain node, the first encrypted traffic volume value of the i-th-level target to at least one other blockchain node of the blockchain as part of a distributed node consensus process;

obtaining, by the blockchain node, a second encrypted traffic volume value of the i-th-level target from the at least one other blockchain node, wherein i is a positive integer;

executing, by the blockchain node, a smart contract to allocate resources to the i-th-level target based on a resource allocation scheme in the smart contract that corresponds to the first encrypted traffic volume value of the i-th-level target and the second encrypted traffic volume value of the i-th-level target; and automatically allocating, by the blockchain node, the resources to the i-th-level target in response to executing the smart contract.

10. The non-transitory, computer-readable medium of claim 9, wherein allocating the resources to the i-th-level target comprises:

comparing the traffic volume value of the i-th-level target with each resource allocation condition in the smart contract to obtain a resource allocation condition that matches the traffic volume value of the i-th-level target; and allocating the resources to the i-th-level target based on the resource allocation scheme that is in the smart contract and that corresponds to the matched resource allocation condition.

11. The non-transitory, computer-readable medium of claim 9 further comprising:

storing a resource allocation result of the i-th-level target in the blockchain.

12. The non-transitory, computer-readable medium of claim 9, wherein the smart contract is a smart contract corresponding to the tree-structured data describing the target relationships; or the smart contract is a smart contract corresponding to the i-th-level target.

13. The non-transitory, computer-readable medium of claim 9, wherein the tree-structured data describing the target relationships is a target service relationship tree structure, and the operations further comprise:

receiving registration data sent by an unregistered first target, wherein the registration data comprises a service tier of the first target;

determining a service tier of a second target that is in the target service relationship tree structure and that invites the first target to register; and adding the first target to the target service relationship tree structure based on a comparison between the service tier of the first target and the service tier of the second target.

14. The non-transitory, computer-readable medium of claim 13, wherein adding the first target to the target service relationship tree structure comprises:

determining that the service tier of the first target is lower than the service tier of the second target; and responsive to determining that the service tier of the first target is lower than the service tier of the second target, adding the first target to the target service relationship tree structure by using the first target as a descendant node of the second target.

15. The non-transitory, computer-readable medium of claim 13, wherein adding the first target to the target service relationship tree structure comprises:

determining that the service tier of the first target is equal to the service tier of the second target; and responsive to determining that the service tier of the first target is equal to the service tier of the second target, adding the first target to the target service relationship tree structure as a sibling node of the second target.

16. The non-transitory, computer-readable medium of claim 9, wherein the tree-structured data describing the target relationships is a target invitation relationship tree structure, and the operations further comprise:

determining that an unregistered first target is to be registered;

responsive to determining that the unregistered first target is to be registered, determining a second target that is in the target invitation relationship tree structure and that invites the first target to register; and adding the first target to the target invitation relationship tree structure by using the first target as a child node of the second target.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining, by a blockchain node of a blockchain, tree-structured data describing target relationships corresponding to the blockchain;

obtaining, by the blockchain node, traffic volume values of one or more (i−1)-th-level targets based on the tree-structured data describing the target relationships, wherein an i-th-level target within the tree-structured data is a parent node of the one or more (i−1)-th-level targets and i is greater than 1;

calculating, by the blockchain node, a sum of the traffic volume values of the one or more (i−1)-th-level targets as a traffic volume value of the i-th-level target;

generating, by the blockchain node, a first encrypted traffic volume value of the i-th-level target by encrypting the traffic volume value of the i-th-level target using a cryptographic process;

sending, by the blockchain node, the first encrypted traffic volume value of the i-th-level target to at least one other blockchain node of the blockchain as part of a distributed node consensus process;

obtaining, by the blockchain node, a second encrypted traffic volume value of the i-th-level target from the at least one other blockchain node, wherein i is a positive integer;

executing, by the blockchain node, a smart contract to allocate resources to the i-th-level target based on a resource allocation scheme in the smart contract that corresponds to the first encrypted traffic volume value of the i-th-level target and the second encrypted traffic volume value of the i-th-level target; and automatically allocating, by the blockchain node, the resources to the i-th-level target in response to executing the smart contract.

18. The computer-implemented system of claim 17, wherein allocating the resources to the i-th-level target comprises:

comparing the traffic volume value of the i-th-level target with each resource allocation condition in the smart contract to obtain a resource allocation condition that matches the traffic volume value of the i-th-level target; and allocating the resources to the i-th-level target based on the resource allocation scheme that is in the smart contract and that corresponds to the matched resource allocation condition.

19. The computer-implemented system of claim 17 further comprising:
storing a resource allocation result of the i-th-level target in the blockchain.

20. The computer-implemented system of claim 17, wherein
the smart contract is a smart contract corresponding to the tree-structured data describing the target relationships; or
the smart contract is a smart contract corresponding to the i-th-level target.

21. The computer-implemented system of claim 17, wherein the tree-structured data describing the target relationships is a target service relationship tree structure, and the operations further comprise:
receiving registration data sent by an unregistered first target, wherein the registration data comprises a service tier of the first target;
determining a service tier of a second target that is in the target service relationship tree structure and that invites the first target to register; and
adding the first target to the target service relationship tree structure based on a comparison between the service tier of the first target and the service tier of the second target.

22. The computer-implemented system of claim 21, wherein adding the first target to the target service relationship tree structure comprises:
determining that the service tier of the first target is lower than the service tier of the second target; and
responsive to determining that the service tier of the first target is lower than the service tier of the second target, adding the first target to the target service relationship tree structure by using the first target as a descendant node of the second target.

23. The computer-implemented system of claim 21, wherein adding the first target to the target service relationship tree structure comprises:
determining that the service tier of the first target is equal to the service tier of the second target; and
responsive to determining that the service tier of the first target is equal to the service tier of the second target, adding the first target to the target service relationship tree structure as a sibling node of the second target.

24. The computer-implemented system of claim 17, wherein the tree-structured data describing the target relationships is a target invitation relationship tree structure, and the operations further comprise:
determining that an unregistered first target is to be registered;
responsive to determining that the unregistered first target is to be registered, determining a second target that is in the target invitation relationship tree structure and that invites the first target to register; and
adding the first target to the target invitation relationship tree structure by using the first target as a child node of the second target.

* * * * *

UNITED STATES PATENT AND TRADEMARK OFFICE
CERTIFICATE OF CORRECTION

PATENT NO. : 11,263,569 B2
APPLICATION NO. : 16/808217
DATED : March 1, 2022
INVENTOR(S) : Boyan Jia It is certified that error appears in the above-identified patent and that said Letters Patent is hereby corrected as shown below:

On the Title Page

Item [57], Line 5, delete "ith-level" and insert -- i-th-level --.

Item [57], Line 9, delete "ith-level" and insert -- i-th-level --.

Item [57], Line 12, delete "ith-level" and insert -- i-th-level --.

Signed and Sealed this
Seventeenth Day of May, 2022

Katherine Kelly Vidal
*Director of the United States Patent and Trademark Office*